United States Patent [19]
Cilles

[11] Patent Number: 4,813,749
[45] Date of Patent: Mar. 21, 1989

[54] PILOT OPERATED STEPPING DIRECTIONAL VALVE AND METHOD FOR SINGLE LINE OPERATION

[75] Inventor: Arthur L. Cilles, Worthington, Ohio

[73] Assignee: Dresser Industries, Inc., Dallas, Tex.

[21] Appl. No.: 137,764

[22] Filed: Dec. 24, 1987

[51] Int. Cl.⁴ ............... E21C 27/24; F16K 31/122; F16K 31/54

[52] U.S. Cl. .................. 299/80; 91/189 R; 91/426; 91/433; 251/58; 251/230

[58] Field of Search ............ 91/189 R, 426, 433; 251/58, 230; 92/136; 299/80, 73

[56] References Cited

U.S. PATENT DOCUMENTS

| | | | |
|---|---|---|---|
| 2,171,579 | 9/1939 | Loughbridge | 251/230 |
| 3,617,093 | 11/1971 | Daily | 299/80 |
| 3,650,506 | 3/1972 | Bruton | 251/58 X |
| 3,712,679 | 1/1973 | Amoroso | 299/76 |
| 4,260,128 | 4/1981 | Tito | 92/138 X |
| 4,318,332 | 3/1982 | Shingu | 91/29 |
| 4,647,003 | 3/1987 | Hilpert et al. | 251/58 X |

FOREIGN PATENT DOCUMENTS

| | | | |
|---|---|---|---|
| 207641 | 2/1960 | Fed. Rep. of Germany | 251/58 |
| 594738 | 6/1959 | Italy | 92/138 |

Primary Examiner—Jerome W. Massie, IV
Assistant Examiner—David J. Bagnell
Attorney, Agent, or Firm—Sigalos, Levine & Montgomery

[57] ABSTRACT

A piloted rotary two-way "on-off" valve which will couple hydraulic fluid from the valve input to the valve output in the "on" position and then move to the "off" position where it will maintain the pressure on the down stream side while enabling the pressure on the upstream side to be removed.

34 Claims, 3 Drawing Sheets

PILOT OPERATED STEPPING DIRECTIONAL VALVE AND METHOD FOR SINGLE LINE OPERATION

BACKGROUND OF THE INVENTION

The present invention relates generally to a pilot operated rotary valve and in particular to a pilot operated rotary valve which can be turned to an "on" or "off" position with an increase in hydraulic pressure in a single hydraulic flow line. The novel valve will select and operate one or more resiliently biased, two position actuator(s) as a result of alternate cycles of hydraulic pressurization and depressurization of a single inlet line supplied from an external pressure control source.

There are many applications in the prior art where it is necessary to operate a hydraulic actuator with only one hydraulic line, and, in some cases, pressure is required to be maintained in that line in order to hold the actuator in the required position. Such case may occur where there is no opportunity to have a manually operated shut-off valve because of lack of space or access.

For instance, continuous mining machines have a rotatable mining head with an elongated shaft carrying a plurality of laterally spaced rotatable cutter support members. An outer cutter support member is mounted on each end of the shaft in a fluid tight relationship and each is extensibly and retractably movable axially on the shaft away from and towards the center of the mining head to thereby change the width of the mining head. Each of the outer support members is resiliently biased to the innermost position on the shaft and a single fluid channel extends axially through the shaft for supplying hydraulic fluid from a pressure source to the interior of each of the outer support members to extend them outwardly. Thus when the machine is cutting in a seam of coal or ore, lo pressure is supplied through the fluid channel which forces the outer support members to their extended positions. As long as the machine is cutting or mining material, the fluid pressure is maintained in the fluid channel to keep the outer support members in their extended position. When it is necessary to move the mining machine back from the mining face, it is necessary to remove the fluid pressure to allow the outer cutter support members to return to their innermost positions by means of biasing springs thereby providing clearance on each end of the cutting head which will allow the machine to be maneuvered from its final cutting position.

This system uses high pressure seals about the rotating shaft so that hydraulic fluid can be coupled externally of the rotating shaft to the fluid channels which are formed on the inside of the shaft and extend axially through the shaft for supplying the hydraulic fluid to the interior of each of the outer support members. Once the pressure has been applied with such a force as to extend the outer cutter support members, that pressure must be maintained until the cutting is completed and then the outer cutter support members can be retracted. This creates a sustained pressure on the seals about the rotating shaft which carries the cutter heads. This sustained pressure causes the seals to wear rapidly. Since they are expensive and time consuming to replace it would be advantageous to find means for enabling the outer cutter support members to be maintained in the extended position with the pressure removed from the seals until such time that it is necessary to retract the outer cutter support heads. Since only one hydraulic flow line can be accommodated through the seals, any attempt to place a normal pilot operated valve between the seals and the outer support members can be disregarded. Further, a manually operated valve could not be operated under such conditions because there is no access to it.

The hydraulic device of the present invention is a pilot operated, stepping, directional valve which will select and operate one or more resiliently biased, two position actuator(s) as a result of alternate cycles of hydraulic pressurization and depressurization of a single inlet line, supplied from an external pressure control source.

This device will permit hydraulic flow directly to the outlet(s) anytime the inlet is pressurized. Thus, the first cycle will extend the actuator and, at the same time, close the directional valve to block the fluid flow from the actuator to the inlet line thus keeping the actuator(s) extended. The next cycle of pressurization will open the valve between the inlet and outlet(s) and the valve will remain open during the depressurization part of the cycle, allowing the trapped fluid volume in the actuators to return through the inlet to the single hydraulic line to the source thus allowing the resiliently biased actuator(s) to return to the retracted position.

Thus, the present valve circuit permits depressurization of a single inlet line while maintaining pressure on the outlet which in-turn traps the fluid volume necessary to maintain extension of the actuator(s). This unique feature relieves internal system components in the supply pressure line of high pressure (such as rotary junction seals) while keeping the actuator(s) extended. As stated, this valve allows the operation of one or more resiliently (spring) biased hydraulic actuators by using a single hydraulic pressure line. It is applied primarily where the supply line, from the hydraulic pressure source to the actuators, must traverse through a rotating section where multiple fluid passages would normally require complex drillings and elaborate concentric rotary seals. An example would be the extendable cutter ends of a continuous mining machine with a rotating cutter drum.

Thus it is an object of the present invention to provide a piloted rotary "on-off" valve which will couple hydraulic fluid from a valve input to a valve output in the "on" position and then move to the "off" position where it will stay, thereby retaining the fluid volume on the down stream side while enabling the pressure on the upstream side to be removed. With a successive increase in pressure on the upstream side, the rotary valve will then index once again to the "on" position thus opening the valve to enable the fluid volume and pressure on the downstream side to be relieved with the successive decrease of upstream hydraulic pressure.

It is also an object of the present invention to provide apparatus for extending, holding and enabling retraction of a hydraulic actuator using only a single pressurizable hydraulic fluid line without maintaining the pressure in the hydraulic fluid line while holding the actuator in this extended position.

It is still another object of the present invention to provide a two-way valve which is driven to a different position, either open or closed, each time the single hydraulic line is pressurized thereby affecting either extension or retraction of a hydraulic device coupled thereto.

It is yet another object of the present invention to utilize the piloted rotating valve in a continuous mining machine with a single hydraulic line wherein a two-way valve is driven to a different position, either open or closed, to affect extension or retraction of the outer cutter head support members. Extension of the outer support members is maintained and the internal fluid pressure released from the seals until a retraction of the outer support members is desired. A repressurization of the hydraulic line changes the valve position to the "on" position and when the hydraulic pressure is removed, the position of the extended auger is reversed by a spring or other resilient bias means which returns it to the retracted position.

SUMMARY

Thus the present invention relates to a piloted rotary valve comprising a "two-way on-off" valve having an input for receiving alternate cycles of fluid pressure and an output for pressurizing a load when the valve is in the "on" position, and means mechanically coupled to the "on-off" valve and responsive to a first cycle of pressurization at the valve input to pressurize the load and concurrently rotate the valve to the "off" position to maintain the load pressurization during the subsequent cycle of depressurization at the input and responsive to a second cycle of pressurization at the input to rotate the valve to the "on" position and relieve the load pressurization during the subsequent cycle of depressurization.

The invention also relates to an apparatus for extending, holding and retracting a resiliently biased hydraulic actuator using only a single inlet hydraulic fluid line comprising a two-way directional valve having an input for receiving cyclical hydraulic pressure from the single inlet line and a hydraulic output for coupling to the at least one actuator, means in the valve responsive to a first cycle of pressurization to cause an extension of the actuator and concurrently close the directional valve to block fluid flow between the actuator and the single inlet line during a subsequent depressurization cycle to maintain the actuator in the extended position and said means in the valve enabling the subsequent cycle of pressurization of the single input line to open the valve and couple the blocked fluid in the actuator through the valve to the hydraulic input and allow the resiliently biased actuator to return to the retracted position during the subsequent depressurization cycle.

The invention also relates to an improvement in a continuous mining machine having a rotating mining head with an elongated shaft carrying a plurality of laterally spaced rotatable cutter support members, the outer cutter support member being mounted on each end of said shaft in a fluid tight relationship and being extensibly and retractably movable axially on said shaft away from and towards the center of said mining head to thereby change the width of said mining head, each outer support member being resiliently biased to the innermost position on said shaft, and an single fluid channel extending axially through said shaft for selectively and cyclically supplying hydraulic fluid from a pressure source to the interior of each of said outer support members to extend said outer support members, the improvement comprising means coupled to the single fluid channel in the shaft for utilizing the cyclically supplied hydraulic pressure to extend, hold and enable retraction of the biased outer support member, said means being mounted between each end of the elongated shaft and its corresponding biased outer cutter support member.

BRIEF DESCRIPTION OF THE DRAWINGS

These and other objects of the present invention will be disclosed in conjunction with accompanying drawings in which like numerals represent like elements and in which.

DETAILED DESCRIPTION OF THE DRAWINGS

Figure 1:
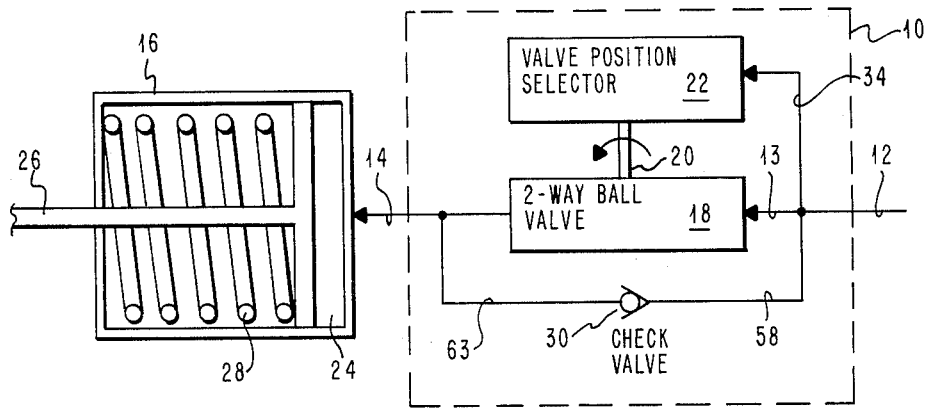
FIG. 1 is a diagrammatic representation of the novel val to an extensible arm.

FIG. 1 is a diagrammatic representation of the novel two-way directional valve 10 coupled to an actuator 16 having an extensible rod or piston 26. The valve 10 has a single hydraulic line input 12 and an output 14 which is coupled to the hydraulic actuator 16.

The novel valve 10 includes a rotary valve 18 of any type, such as a two-way ball valve, which is wellknown in the art, which has an orifice 32 (FIG. 2) coupling input line 12 to output line 14 in the "on" position and has no connection between input line 12 and output line 14 in the "off" position. The ball is rotated between the "on" and "off" positions by a mechanical linkage 20 which is driven by a pilot operated valve position selector mechanism such as, for example, rack/racheting device 22 in response to cyclically applied pressurization and depressurization. When the ball is in the "on" position and the first cycle of pressurization is applied to input 12, the hydraulic fluid passes through ball 18, via hydraulic passage 13 to valve output 14 thereby pressurizing chamber 24 of actuator 16 causing piston or rod 26 to move against springs 28 thereby compressing springs 28 and extending piston or rod 26. That same pressure is simultaneously applied to the valve piston selector device 22 to cause it to actuate mechanical linkage 20 which rotates the ball valve 18 to the "off" position. If the ball valve 18 moves to the "off" position before the rod or piston 26 has been fully extended, one-way check valve 30, which is well-known in the art, will open to allow the hydraulic fluid in input line 12, via hydraulic passage 58, to continue to pass to output 14 and actuator 16 until rod or piston 26 is fully extended.

In the depressurization cycle when the hydraulic pressure is totally removed from valve input 12, piston or rod 26 remains fully extended because two-way ball valve 18 is now in the "off" position preventing any reverse fluid flow and the one-way check valve 30 is in the checked position and thus the piston arm 26 is maintained in the extended position even though there is no hydraulic pressure at valve input 12.

When it is desired to retract piston 26, a subsequent cycle of hydraulic pressurization is applied to input 12 and that same pressure is simultaneously coupled to valve position selector 22 and check valve 30. Valve positioning device 22, under the influence of the fluid pressure, rotates ball valve 18 through mechanical linkage 20 to its "on" position. When the subsequent depressurization cycle occurs and the pressure at valve input 12 is reduced or removed, the pressure maintained in cavity 24 of actuator 16 is now allowed to flow back through orifice 32 (FIG. 2) of ball valve 18 to the valve input 12 thus relieving the pressure on piston or arm 26. Springs 28 then return the piston 26 to its normally retracted position.

Thus ball valve 18 is an "on-off" valve having an input 12 for receiving fluid pressure and an output 14 for pressurizing a load 16. Valve positioning device 22 is mechanically coupled through linkage 20 to valve 18 and is responsive to cyclical hydraulic pressure appearing at valve input 12 for rotating valve 18 to the "off" position to disconnect the input 12 from the load 16 and leave load 16 pressurized even though the pressure is removed from valve input line 12 during the subsequent depressurization cycle. Valve positioning device 22 is also responsive to the next cyclical appearance of pressure at input line 12 to rotate valve 18 through mechanical linkage 20 to the "on" position once again for coupling the valve input 12 to the valve output 14 such that during the subsequent depressurization cycle when the pressure is removed from valve input 12 the load 16 pressurization is relieved. One-way check valve 30 is connected in hydraulic parallel with the "on-off" valve 18 between the input 12 and output 14 for allowing the cyclical increase in pressure at input 12 to pass to load 16 around the "on-off" valve 18 but prevents hydraulic pressure from passing around valve 18, in the reverse direction when the valve 18 is in the "off" position.

Figure 2:
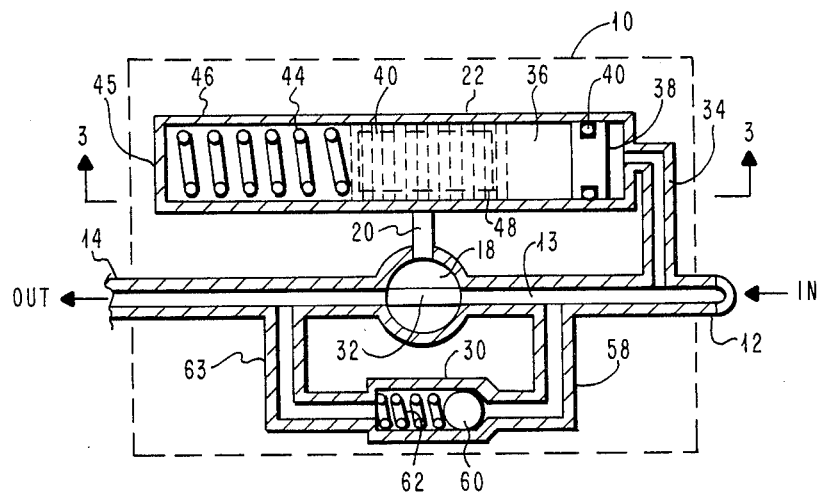
FIG. 2 is a diagrammatic representation of the novel valve.

FIG. 2 is a more detailed view of the two-way "on-off" valve 10. Hydraulic fluid in input line 12 is passed through line 13 and directly through an orifice 32 in two-way ball valve 18 to the output line 14. The fluid is simultaneously coupled through conduit 34 to a valve position control device such as rack/ratcheting device 22. Device 22 comprises a rack 36 which has a piston head 38 for receiving hydraulic fluid from line 34. Seals 40 on piston 38 prevent hydraulic fluid from passing around the sides to the rack 36. The base of the rack device has teeth 40 which are engaged with teeth 42 (FIG. 3) of a gear 48. A spring 44 resiliently biases the rack in a first position against the hydraulic input end of the structure 46 in which the rack 36 is housed. When hydraulic pressure is supplied to valve input 12 and conduit 34 against the piston surface 38 of rack 36, the rack 36 begins to move to a second predetermined position compressing spring 44. At the same time, the teeth 40 of the rack 36 which are engaged with teeth 42 of gear 48 causes gear 48 to rotate to a first position in one direction.

Figure 3:
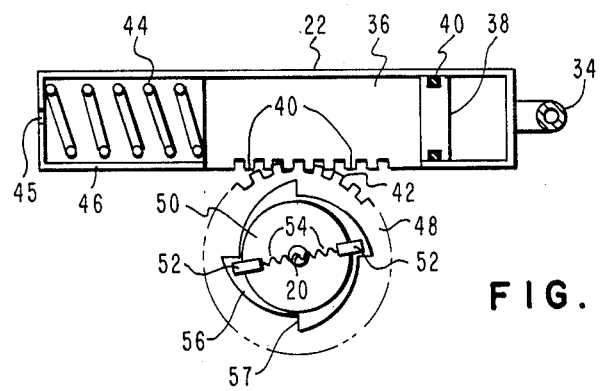
FIG. 3 is a side view of the rack and gear of the valve take lines 3—3 of FIG. 2.

As can be seen in FIG. 3, the gear 48 has a hollow interior and is mounted about cylindrical shaft 50. Shaft 50 has pins 52 which are biased with springs 54 to their outermost position where they contact the inner surface of gear 48. The inner surface of gear 48 is formed with arcuate sections 56 having projections 57 formed in a well-known manner which engage pins 52 when the shaft 50 is rotated in the counterclockwise direction in FIG. 3. Mechanical coupling 20 connects the shaft 50 to ball valve 18 thus rotating the ball valve 18 each time shaft 50 is rotated. Shaft 50 forms a part of a ratchet system which in conjunction with gear 48, is rotated counterclockwise each time the rack 36 is forced to the left in FIG. 3 by the cyclical increase in pressure on piston 38.

When pressure is subsequently removed from valve input 12 and conduit 34 such that there is no longer any pressure on piston 38, spring 44 biases the rack 36 to its first position, thus rotating gear 48 clockwise in FIG. 3. Note however, that arcuate inner surfaces 56 of gear 48, while rotating clockwise, simply force pins 52 against springs 54 thus allowing the gear 48 to rotate freely in the clockwise direction without turning shaft 50, thereby leaving two-way ball valve 18 in its "off" position. If during this period of time, the actuator 16 has not been fully extended, the fluid pressure on valve input line 12 will be coupled through conduit 58 to check valve 30 forcing ball 60 against spring 62 and allowing the hydraulic pressure to pass through check valve 30 to the output line 14 thereby continuing to move the piston or arm 26 in actuator 16 to its fully extended position. When piston 26 has been fully extended, the pressure is removed from valve input 12. Since two-way ball valve 18 is now in its "checked" position, fluid cannot pass through the ball valve 18 from the valve output 14 to the valve input 12. Further, since check valve 30 is a one-way valve which allows the fluid to pass only from the check valve input 58 to the check valve output 63, spring 62 and the pressure at the check valve output 63 maintain ball 60 tightly sealed against conduit 58 thereby blocking any passage of pressurized fluid from output 14 to input 12. The arm 26 is now fully extended and remains fully extended even though pressure is removed from valve input 12.

If it is desired to retract the extensible piston 26, valve input 12 is again pressurized and the pressure is coupled through conduit 34 again to piston 38 which moves rack 36 to the left in FIGS. 2 and 3 thus again moving ball valve 18 from its closed or "off" position to its open or "on" position as shown in FIG. 2. When the pressure is relieved at valve input 12, the pressure on the extensible arm or piston 26 will also then be relieved through the ball valve 18 to the valve input 12 thus allowing springs 28 in actuator 16 to return arm 26 to its initial retracted position.

In summary, hydraulic pressure enters the valve inlet 12 and flows through valve outlet 14 to the spring biased actuator 24 through the "open" directional valve 18 and check valve 30 and to the pilot operated valve position selector mechanism 22 ratchet device in FIG. 2). The piston 38 of the position selector is mechanically coupled to a ratchet device 52 on the directional valve 18, indexing the directional valve to the closed position. Inlet flow will continue to pass through the check valve 30 until the actuator 24 is in its fully extended position. Pressure is then reduced at inlet 12 and full extension of the actuator is maintained by the "closed" two-way rotary valve and the biased check valve. The reduced pressure on the inlet passages 12, 34 and 58 permits the resilient bias means 44 to return selector mechanism piston and mechanical linkage to the original position indexing the rachet 52.

The actuator now stays in the fully extended position with the reduced pressure in the single inlet pressure line 12.

With flow from the actuator 24 blocked, the inlet 12 is then selectively repressurized. The flow goes directly to piston 38 of the selector mechanism 22 as both the directional valve 18 and the check valve 30 are "closed". This pressure actuates the selector mechanism 22 and in turn the linkage and ratchet device 52 and the directional valve 18 rotates to the "open" position. When the pressure on inlet 12 is again reduced, the fluid from the resiliently biased actuator is permitted to flow directly through the "open" directional valve 18 from the outlet 14 to the inlet 12 allowing the resiliently biased actuator to return to the fully retracted position. The rack 36 of pilot operated selector mechanism 22 also returns to the original position reindexing the ratchet.

Figure 4:
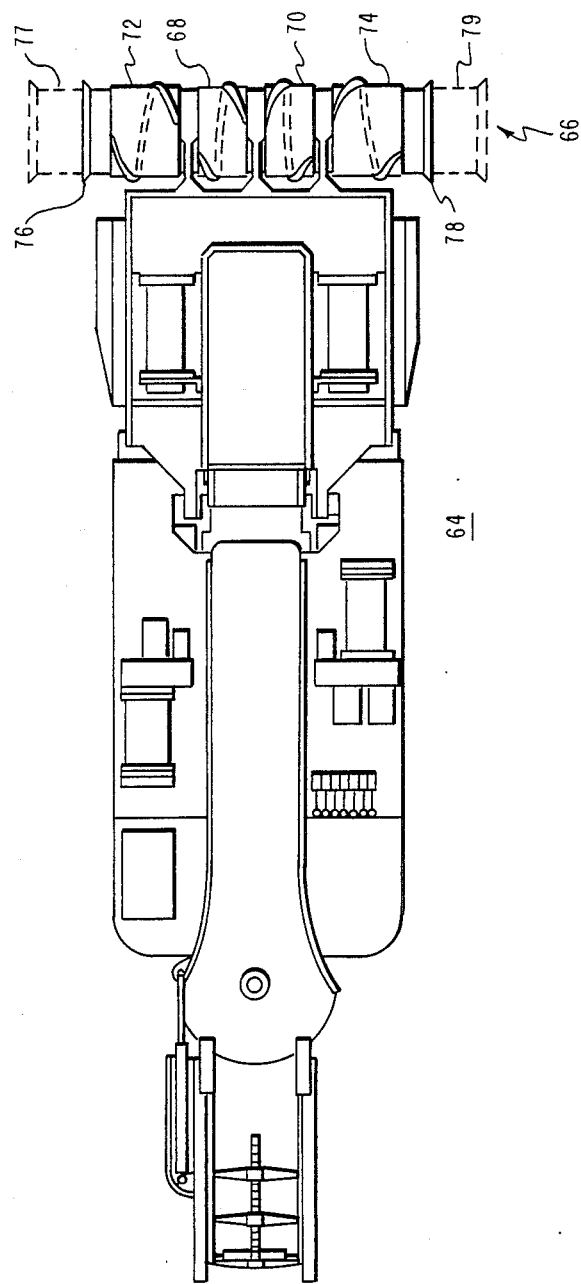
FIG. 4 is a plan view of a typical mining machine with a cutter head which is expandable in width a dashed lines.

The novel valve arrangement shown in FIGS. 2 and 3 is especially useful in a continuous mining machine having a rotatable mining head such as shown in FIG. 4. FIG. 4 discloses the continuous mining machine generally at 64 which has at the forward end thereof a rotatable mining head 66 which has an elongated shaft carrying a plurality of laterally spaced rotatable cutter support members 68, 70, 72, 74, 76 and 78. Each of these support members has cutters thereon for digging mining material as the cutter support members rotate. As the mining machine moves forward in the direction of the material being mined, the outer cutter support members 76 and 78 are, at the outer ends thereof, in an abutting relationship with the face of the material being mined. Thus when it becomes necessary to back the mining machine 64 away from the face which is being worked, the machine 64 must be moved in a straight line because there is so little clearance between the outer ends of the cutting heads 76 and 78 with respect to the side walls of the entry being mined. Thus it becomes important to enable the outer cutter support members to be extensibly and retractably movable axially on the shaft away from and towards the center of the mining head to thereby change the width of the mining head. Each outer support member 76 and 78 is resiliently biased to the innermost position on the shaft in a well-known manner such as with the use of springs. A single fluid channel extends axially through the elongated shaft for selectively supplying hydraulic fluid from a pressure source to the interior of each of the outer support members 76 and 78 to extend them as necessary to the positions 77 and 79 as shown in dashed lines.

Figure 5:
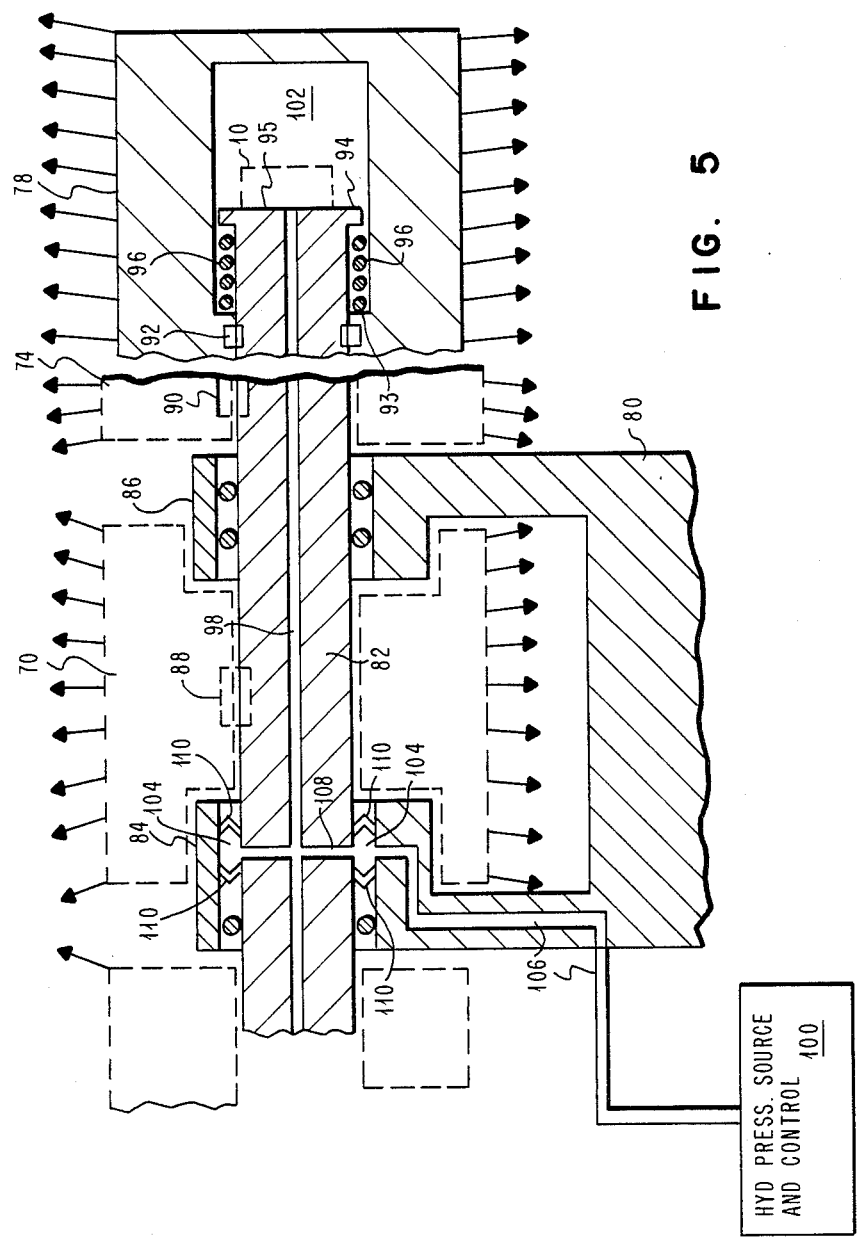
FIG. 5 is a cross-sectional view of a portion of a mining machine cutter head illustrating where the novel valve is located between the outer end of the shaft and the interior of the outer cutter support members for extending, maintaining and retracting said support members.

FIG. 5 is a partial diagrammatic cross-sectional view of the rotatable mining head. Frame 80 in FIG. 5 carries an elongated shaft 82 in bearing supports such as 84 and 86. Rotatable cutter heads 70 and 74 are mounted on shaft 82 by any well-known means such as keys 88 and 90 and rotate therewith. Outer cutter support member 78 is also rotatably mounted to shaft 82 by means of a key 92 but is also mounted in fluid tight relationship on the end 94 of shaft 82 and is extensibly and retractably movable axially on shaft 82 away from and towards the center of the mining head thereby changing the width of the mining head 66 (FIG. 4). A spring member 96 is mounted between shoulders 93 and 94 and resiliently biases the outer cutter support member 78 to the innermost position on shaft 82. A single hydraulic fluid channel 98 extends axially through the shaft 82 for supplying hydraulic fluid from an exterior pressure source 100 to the interior 102 of each of the outer support members 76 (FIG. 4) and 78 to extend them to their outer-most position. Chambers 104 connect the pressurized hydraulic fluid from source 100 through conduit 106 to passageway 108 which extends radially through shaft 82 and connects with fluid channel 98. As can be understood, rotating seals 110 confine the pressurized fluid and are subjected continuously to the pressure from the source 100 when the outer cutter support members 76 and 78 are extended because as stated previously with respect to the prior art, the pressure must be maintained in order to hold them extended. This pressure causes the rotating seals 110 to wear rapidly. As stated previously, they are expensive and time consuming to replace.

By mounting the piloted/ratcheting rotary valve 10 of the present invention between each end (95 in FIG. 5) of the elongated shaft 82 and its corresponding biased outer cutter support member 76 or 78 as shown in FIG. 4, valve 10 can be selectively supplied hydraulic pressure through channel 98 to extend, hold and enable retraction of the biased outer support members 76 and 78. As explained earlier, when fluid pressure is increased from pressure source 100 to hydraulic fluid channel 98, with valve 10 in the "on" position, the fluid passes directly through the valve and extends outer cutter support members 76 and 78. When the support members 76 and 78 are fully extended, valve 10 has been rotated to its "off" position as described previously, and the fluid pressure from source 100 can be removed thus removing the pressure from seals 110. The support members 76 and 78 are then maintained in the extended position when the pressure is removed from channel 98 because the pressure in interior 102 cannot escape through valve 10. When it is desired to retract the outer support members 76 and 78, a subsequent increase of pressure in fluid channel 98 rotates the valve 10 to the "on" position and couples fluid channel 98 to the interior 102 of support members 76 and 78 so that when pressure is subsequently removed from channel 98, the springs 96 can return the outer cutter support members 76 and 78 to their retracted position.

Thus there has been disclosed a novel two-way pilot operated, rotary valve which, under the influence of hydraulic pressure, alternates between and open and closed positions. Thus each time the main hydraulic line is pressurized, the two-way valve is actuated to a different position, either open or closed, which of course can affect either extension or retraction of an actuator arm. If the arm is extended, that position will be maintained even though the hydraulic fluid pressure is removed from the inlet to the valve. When a change in position of the actuator is desired, repressurization of the hydraulic line changes the valve position and thereby enables the extended actuator to be retracted.

As pointed out herein, the invention will function with any single pressurizable hydraulic line and an extensible actuator and has particular application in continuous mining machines wherein the cutting head is required to change in width thereby allowing cutter heads to be extended, maintained and then retracted simply by alternately pressurizing and depressurizing the fluid supply line.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:
1. A piloted rotary valve comprising:
   a. a two-way "on-off" valve having an input for receiving alternate cycles of fluid pressurization and depressurization and an output for pressurizing a load; and
   b. means mechanically coupled to said "on-off" valve and responsive to a first cycle of pressurization at the valve input to pressurize the load and concurrently rotate the valve to the "off" position to maintain the load pressurization during the subsequent cycle of depressurization and responsive to a second cycle of pressurization at the input to rotate the valve to the "on" position and relieve load pressurization during the subsequent cycle of depressurization.

2. A valve as in claim 1 further comprising a one-way check valve connected in hydraulic parallel with said "on-off" valve input and output for allowing said fluid to pass to said load around said "on-off" valve during the cycle of pressurization and preventing hydraulic pressure from passing from said load to said input when said valve is in said "off" position during the subsequent cycle of depressurization.

3. A valve as in claim 2 wherein said mechanically coupled means comprises:
   a. a circular gear coupled to the "on-off" valve for alternately rotating the valve to the "on" and the "off" positions,
   b. a spring-loaded gear rack in operative engagement with the circular gear for movement from a first position to a second position to rotate the gear a predetermined distance only in one direction, said spring biasing the rack to its first position, and
   c. means coupling the input pressure to said rack to move the rack from the first position to the second position for rotating the valve to one of the "on" and "off" positions.

4. Apparatus as in claim 3 further including a piston coupled to said rack for receiving said pressure from said valve input.

5. A method of forming a piloted, rotary valve comprising the steps of:
   a. forming a two-way "on-off" valve having an input for receiving alternate cycles of fluid pressurization and depressurization and an output for pressurizing a load, and
   b. coupling mechanical means to said "on-off" valve which is responsive to a first cycle of pressurization at the valve input to pressurize the load and concurrently rotate the valve to the "off" position to maintain the load pressurization during the subsequent cycle of depressurization and responsive to a second cycle of pressurization to rotate the valve to the "on" position and relieve load pressurization during the subsequent cycle of depressurization.

6. A method as in claim 5 further comprising the step of connecting a one-way check valve in hydraulic parallel with said "on-off" valve between said input and output for allowing said fluid to pass to said load around said "on-off" valve during the cycle of pressurization and preventing hydraulic fluid from passing from said load to said input when said valve is in said "off" position during the subsequent cycle of depressurization.

7. A method as in 6 wherein the step of coupling mechanical means to said "on-off" valve further comprises the steps of:
   a. coupling a circular gear to said "on-off" valve for alternately rotating said valve to said "on" and said "off" positions,
   b. operatively engaging a spring-loaded gear rack with said circular gear for movement from a first position to a second position to rotate said gear a predetermined distance only in a first direction, said spring biasing said rack to its first position, and
   c. coupling input pressure to said rack for moving said rack to said second position and rotating said valve to one of said "on" and "off" positions.

8. A method as in claim 7 further comprising the step of coupling a piston to the rack for receiving pressure from the valve input to move the rack from the first to the second position.

9. Apparatus for extending, holding and retracting a resiliently biased hydraulic actuator using only a single inlet hydraulic fluid line comprising:
   a. a two-way directional valve having an input for receiving cyclical hydraulic pressure from the single inlet line, and a hydraulic output for coupling to the at least one actuator,
   b. means in the valve responsive to a first cycle of pressurization to cause an extension of the actuator and concurrently close the directional valve to block fluid flow between the actuator and the single inlet line during a subsequent depressurization cycle to maintain the actuator in the extended position, and
   c. said means in the valve enabling the subsequent cycle of pressurization of the single input line to open the valve and couple the blocked fluid in the actuator through the valve to the hydraulic input and allow the resiliently biased acutator to return to the retracted position during the subsequent depressurization cycle.

10. Apparatus as in claim 9 wherein said valve comprises:
    a. a rotary, two-way "on-off" valve, and
    b. mechanical means coupled to the "on-off" valve and responsive to a first cycle of pressurization to cause extension of the actuator and concurrently rotate the valve to the "off" position so as to maintain the extension of the actuator by blocking fluid flow between the actuator and the single inlet line during the subsequent depressurization cycle and responsive to the subsequent cycle of pressurization of the inlet line to rotate the valve to the "on" position to couple blocked fluid in the actuator to the inlet through the valve and allow the actuator to return its retracted position during the subsequent depression cycle.

11. Apparatus as in claim 10 wherein the two-way valve comprises a pilot operated, stepping valve.

12. Apparatus as in claim 10 further including a one-way check valve connected between the input and the output in hydraulic parallel with the "on-off" valve for allowing the fluid in the inlet line during the first cycle of pressurization to pass to the actuator around the "on-off" valve and maintaining the actuator in the extended position during the subsequent depressurization cycle.

13. Apparatus as in claim 12 wherein said mechanically coupled means comprises:
    a. a circular gear coupled to the "on-off" valve for cyclically rotating the valve to the "on" and "off" positions,
    b. a valve position selector in operative engagement with the circular gear for movement from a first position to a second position to rotate the gear a predetermined distance only in one direction, said valve position selector being biased to its first position, and
    c. means coupled to the valve position selector for receiving the hydraulic pressure and moving the selector to the second position for rotating the valve to one of the "on" and "off" positions.

14. Apparatus as in claim 13 wherein said means coupled to said selector i a piston responsive to the pressure from the valve input and moving the rack from the first position to the second position.

15. Apparatus as in claim 10 further comprising:
   a. an arm portion formed as a rotating shaft,
   b. a cylindrical portion forming the hydraulic actuator and mounted on at least one outer end of the rotating shaft in fluid tight relationship for rotation therewith, said cylindrical portion being extensibly and retractably movable axially on the shaft; and
   c. biasing means between the arm and the cylindrical portion for resiliently biasing the cylindrical portion to its retracted position on the shaft.

16. Apparatus as in claim 15 further comprising:
   a. a single orifice extending axially through the shaft for selectively supplying hydraulic fluid from a pressure source to the interior of the cylindrical portion mounted on the at least one outer end of the rotating shaft to extend the cylindrical portion; and
   b. said "on-off" valve and said mechanical means being mounted between the end of the shaft and the interior of the cylindrical portion, the valve input being coupled to the orifice for utilizing the selectively supplied fluid to extend, hold and enable retraction of the biased cylindrical portion.

17. A method for extending, holding and retracting a resiliently biased hydraulic actuator using only a single inlet hydraulic fluid line comprising:
   a. forming a two-way directional valve having an input for receiving cyclical hydraulic pressure from the single inlet line and a hydraulic output for coupling to the at least one actuator,
   b. extending the acutator in response to a first cycle of pressurization,
   c. concurrently closing the directional valve to block fluid flow between the actuator and the single inlet line during a subsequent depressurization cycle to maintain the actuator in the extended position, and
   d. opening the valve in response to the subsequent cycle of pressurization of the input line to couple the blocked fluid in the actuator through the valve to the hydraulic input and allow the resiliently biased actuator to return to its retracted position during the subsequent depressurization cycle.

18. A method as in claim 17 further comprising the steps of:
   a. forming said two-way directional valve as a rotary, "on-off" valve, and
   b. coupling mechanical means to the "on-off" valve for responding to a first cycle of pressurization to extend the actuator and concurrently rotate the valve to the "off" position so as to maintain the extension of the actuator by blocking fluid flow between the actuator and the single inlet line during the subsequent depressurization cycle and responding to the subsequent cycle of pressurization of the inlet line to rotate the valve to the "on" position to couple blocked fluid in the actuator to the inlet through the valve and allow the actuator to return to its retracted position during the subsequent depressurization cycle.

19. A method as in claim 18 further including the step of forming said valve as a pilot operated stepping valve.

20. A method as in claim 18 further comprising the step of connecting a one-way check valve in hydraulic parallel with said "on-off" valve for allowing fluid in the input line to pass to said actuator around said "on-off" valve during the first cycle of pressurization and maintaining the actuator in the extended position during the subsequent depressurization cycle.

21. Apparatus as in claim 20 wherein the step of coupling mechanical means to said "on-off" valve further comprises the steps of:
   a. coupling a circular gear to the "on-off" valve for cyclically rotating the valve to the "on" and "off" positions,
   b. operatively engaging a valve position selector with the circular gear for movement from a first position to a second position to rotate the gear a predetermined distance only in one direction, said valve position selector being biased to its first position, and
   c. coupling pressure in the hydraulic line to the valve position selector for moving the selector to the second position so as to rotate the valve to one of the "on" and "off" positions.

22. A method as in claim 21 wherein the step of coupling said pressure to said value position selector further comprises the step of coupling a piston to the selector for receiving the pressure from the hydraulic line to move the selector.

23. A method as in claim 18 further including the steps of:
   a. forming an arm portion as a rotating shaft,
   b. forming the hydraulic actuator from a cylindrical portion mounted on at least one outer end of the rotating shaft in fluid tight relationship for rotation therewith, the cylindrical portion being extensibly and retractably movable axially on the shaft; and
   c. resiliently biasing the cylindrical portion to its retracted position on the shaft with biasing means.

24. A method as in claim 23 further comprising the steps of:
   a. extending a single orifice axially through the shaft for selectively supplying hydraulic fluid from a pressure source to the interior of the cylindrical portion mounted on the at least one outer end of the rotating shaft to extend the cylindrical portion; and
   b. mounting the "on-off" valve and the mechanical means between the end of the shaft and the interior of said cylindrical portion, the valve input being coupled to the orifice for utilizing the selectively supplied fluid to extend, hold and enable retraction of the biased cylindrical portion.

25. In a continuous mining machine having a rotatable mining head with an elongated shaft carrying a plurality of laterally spaced rotatable cutter support members, an outer cutter support member being mounted on each end of the shaft in a fluid tight relationship and being extensibly and retractably movable axially on the shaft away from and towards the center of the mining head to thereby change the width of the mining head, each outer support member being resiliently biased to the innermost position on the shaft and a single fluid channel extending axially through the shaft for selectively supplying hydraulic fluid from a pressure source to the interior of each of the outer support members to extend the outer support members, the improvement comprising:

a. means coupled to the fluid channel in the shaft for utilizing the selectively supplied hydraulic pressure to extend, hold and enable retraction of the biased outer support member, and b. said means being mounted between each end of the elongated shaft and its corresponding biased outer cutter support member.

26. A continuous mining machine as in claim 25 wherein said pressure utilizing means for receiving hydraulic fluid further comprises:

a. an "on-off" valve coupled between the single channel in the shaft and the outer cutter support member for receiving alternate cycles of fluid pressurization and depressurization to be coupled to the support member for extending holding, and retracting the support member; and b. means mechanically coupled to the "on-off" valve for receiving fluid from the single fluid channel and responsive to a first cycle of pressurization in the single channel for rotating the valve to said "off" position to maintain the support member in the extended position during the subsequent cycle of depressurization and responsive to a second cycle of pressurization in the fluid channel to rotate the valve to the "on" position and relieve the support member pressurization during the subsequent cycle of depressurization to enable the support member to return to the retracted position.

27. A continuous mining machine as in claim 26 further including a one-way check valve connected in hydraulic parallel with the "on-off" valve for allowing the fluid to pass to the support member around the "on-off" valve during the pressurization cycle but preventing hydraulic pressure from passing from the support member to the channel when the valve is in the "off" position during the subsequent depressurization cycle.

28. A continuous mining machine as in claim 27 wherein said mechanically coupled means comprises:

a. a circular gear coupled to the "on-off" valve for rotating said valve to alternate ones of the "on" and "off" positions, b. a spring-loaded gear rack in operative engagement with the circular gear to rotate the gear a predetermined distance only in one direction; said spring biasing the rack to its first position, and c. means coupling the fluid channel to the rack to move the rack so as to rotate the gear and cause the valve to rotate to one of said "on" and "off" positions in response to the predetermined increases in pressure in said channel.

29. A continuous mining machine as in claim 28 wherein said coupling means for said rack is a piston for receiving said fluid pressure from said channel.

30. In a method of operating a continuous mining machine having a rotatable mining head with an elongated shaft carrying a plurality of laterally spaced rotatable cutter support members, mounting a respective one of the outer cutter support members on each end of the shaft in fluid tight relationship and being extensibly and retractably movable axially on the shaft away from and towards the center of the mining head to thereby change the width of the mining head, resiliently biasing each outer support member to the innermost position on the shaft and extending a single fluid channel axially through the shaft for selectively supplying hydraulic fluid from a pressure source to the interior of each of the outer support members to extend the outer support members, the improved method comprising the steps of:

a. coupling means to the fluid channel in the shaft for utilizing the selectively supplied hydraulic pressure to extend, hold and enable retraction of the biased outer support member, and b. mounting said means between each end of the elongated shaft and its corresponding biased outer cutter support member.

31. A method as in claim 30 wherein the step of coupling said apparatus to said fluid channel in said shaft further comprises the steps of:

a. coupling an "on-off" valve between the single fluid channel in the shaft and the outer cutter support member for receiving alternate cycles of fluid pressurization and depressurization to be coupled to the support member for extending, holding and retracting the support member; and b. mechanically coupling means to the "on-off" valve for receiving fluid from the single hydraulic fluid channel and responsive to a first cycle of pressurization in the single channel for rotating the valve to the "off" position to maintain the support member in the extended position during the subsequent depressurization cycle and responsive to a second cycle of pressurization in the fluid channel to rotate the valve to the "on" position and relieve the support member pressurization during the subsequent cycle of depressurization to enable the support member to return to the retracted position.

32. A method as in claim 31 further including the step of connecting a one-way check valve in hydraulic parallel with the "on-off" valve for allowing the hydraulic fluid to pass to the support member around the "on-off" valve during the pressurization cycle but preventing hydraulic pressure from passing from the support member to the channel when the valve is in the "off" position during the subsequent depressurization cycle.

33. A method as in claim 32 wherein the step of coupling mechanical means to said "on-off" valve further comprises the steps of:

a. coupling a circular gear to the "on-off" valve for rotating the valve to alternate ones of the "on" and "off" positions, b. operatively engaging a spring-loaded gear rack with the circular gear for rotating the gear a predetermined distance in only one direction; and c. coupling the fluid channel to the rack to move the rack so as to rotate the gear and cause said valve to rotate to one of the "on" and "off" positions in response to said predetermined increases in pressure in said channel.

34. A method as in claim 33 wherein the step of coupling said hydraulic channel to the rack further comprises the step of coupling a piston to the rack for receiving the pressure from said channel for moving the rack.

* * * * *